Figure 5:
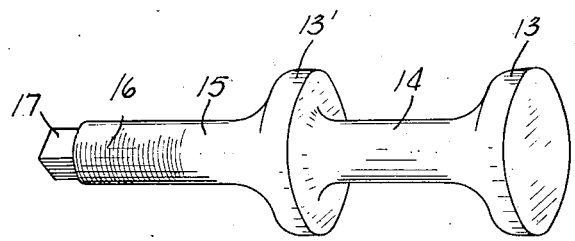

March 17, 1936. F. R. GOEHRING 2,034,573
VALVE CONSTRICTOR
Filed Aug. 20, 1934 2 Sheets-Sheet 1
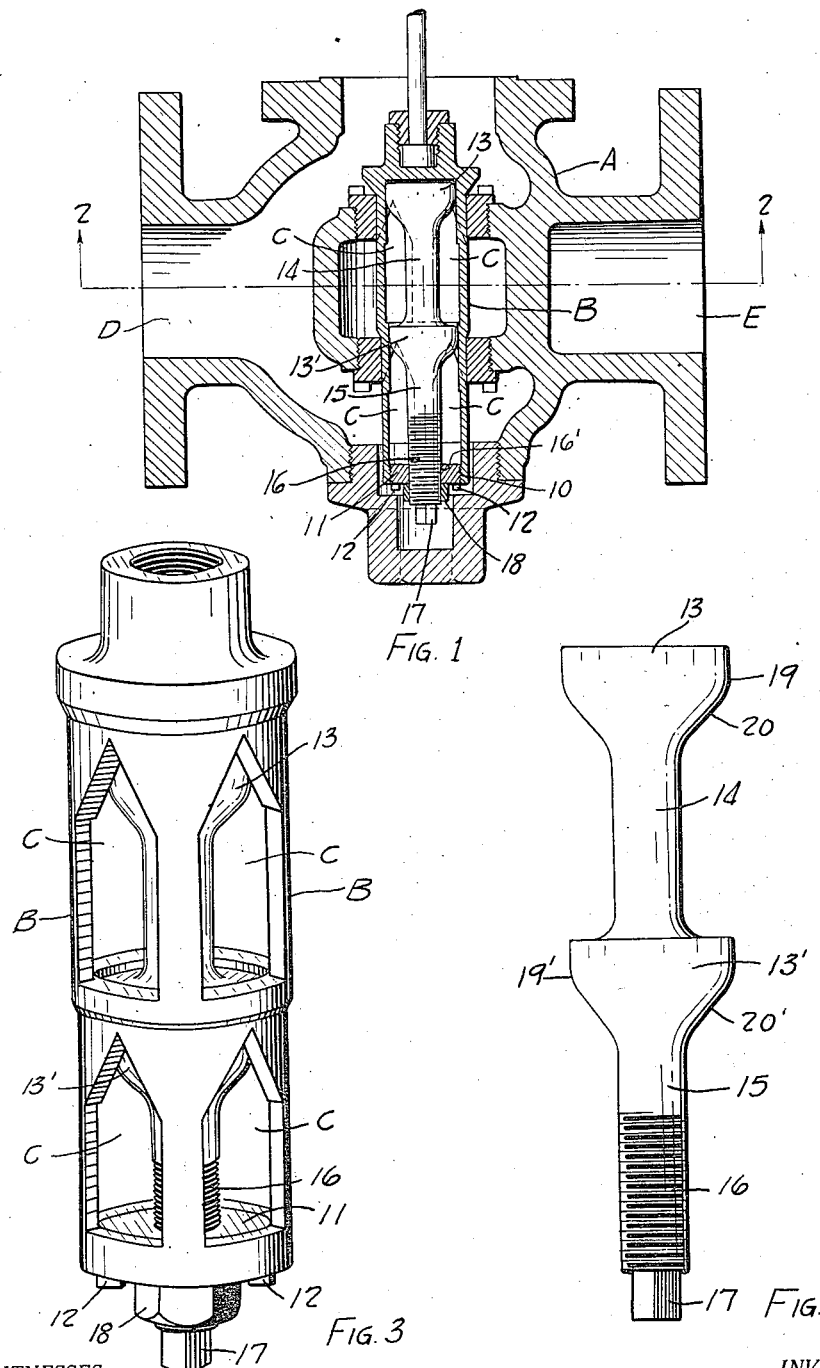
WITNESSES:
INVENTOR:
FRANCIS RUDOLPH GOEHRING.
BY
ATTORNEYS.

March 17, 1936.　　　F. R. GOEHRING　　　2,034,573
VALVE CONSTRICTOR
Filed Aug. 20, 1934　　　2 Sheets-Sheet 2

WITNESSES:　　　　　　　　　　　　　INVENTOR:
　　　　　　　　　　　　　　　FRANCIS RUDOLPH GOEHRING.
　　　　　　　　　　　　　　BY
　　　　　　　　　　　　　　　　　　ATTORNEYS.

Patented Mar. 17, 1936

2,034,573

UNITED STATES PATENT OFFICE 2,034,573

VALVE CONSTRICTOR

Francis Rudolph Goehring, Philadelphia, Pa.

Application August 20, 1934, Serial No. 740,644

7 Claims. (Cl. 251—34)

This invention relates to valve constrictors, and has for an object to provide means whereby a valve of large size may be reduced to the capacity of a valve of smaller size, and maintaining the niceties of adjustment and control afforded by the valve of smaller size.

In many installations, the specifications prepared by engineers call for valves of large size, and in the operation of the installation, after completion, it is discovered that the valves specified are too large, and the adjustment and regulation of the flow through the valve of large size cannot be controlled with nicety required for the work.

In such installations, it entails a great amount of labor, and, therefore, cost to remove the large valve and supplement smaller valves, besides which it may occur at a later date that a valve of larger size would be necessary. Hence, the present invention is addressed to the production of means whereby the valve of larger size may be constricted and perform the function of a valve of smaller size satisfactorily.

The invention is adapted to be applied to a sliding sleeve valve having passages therethrough forming communication between the inlet and outlet ports of the housing and specifically comprises a member which is inserted into the interior of the sleeve constricting the passages in such manner that the actuation of the valve will correspond to a similar actuation of a valve of smaller size.

A further object of the invention is to provide such a constrictor means as may be readily adjusted to correspond to valves of any sizes smaller than the original valve and without interfering with the full capacity of the valve at one adjustment.

The invention, therefore, comprises the combination with a valve of the sliding sleeve type having passages for fluid therethrough from inlet to outlet, and introducing into the interior of the sleeve a constricting member adjustable longitudinally of the sleeve, as occasion may require, said inserted member being shaped to produce in the sleeve passage openings of such extent as to correspond to valves of sizes smaller than the original valve adjustable manually to correspond to valves of any elected smaller sizes.

Figure 2:
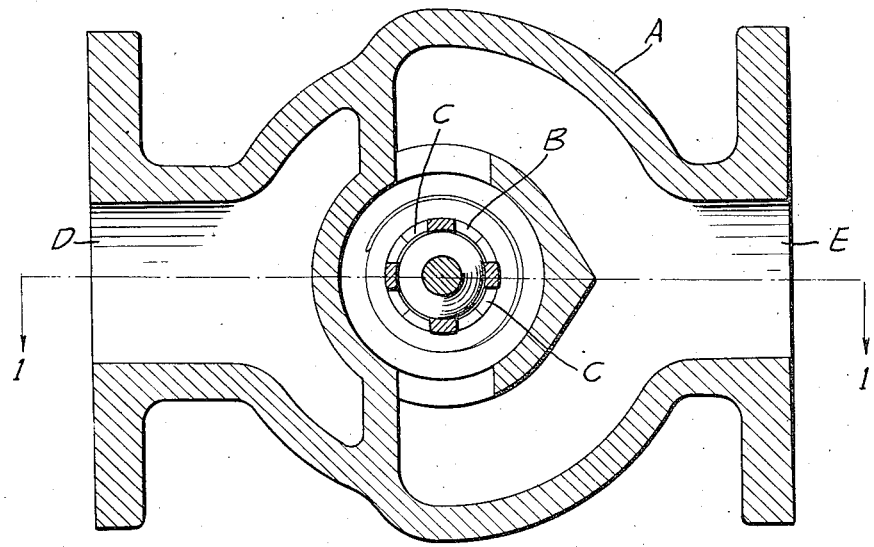

In the drawings,

Figure 1 is a longitudinal sectional view through the valve, the plane being upon a usual vertical, Figure 2 is a sectional view through the valve taken upon a normal horizontal, as indicated by line 2—2 of Figure 1, and exhibiting line 1—1, as the plane of Figure 1, Figure 3 is a perspective view of a sleeve valve with the constrictor mounted therein, Figure 4 is a view of the constrictor in side elevation, and Figure 5 is a perspective view of the constrictor.

Like characters of reference indicate corresponding parts through the several views.

In the drawings, a valve housing "A" is shown merely by way of illustration, and not in any way a limitation upon the invention. It is of a well-known sliding sleeve type, the sleeve being indicated at "B", and provided with a plurality of passages "C" forming communication from the inlet, which may be considered the port "D" to the outlet, which may be considered the port "E", although it is understood that this valve is reversible.

The sleeve "B" is modified only to the extent of providing at its lower end internal threads 10 and applying thereto a disk or deck 11, lugs 12 being shown to which may be applied a spanner for introducing or removing the deck.

The constrictor shown for illustration in side elevation at Figure 4, and perspective at Figure 5, comprises two body parts 13 and 13' having a fairly close fit within the interior of the sleeve. The number of these bodies may be increased or decreased and will depend upon the number of groups of passages "C" formed through the sleeve. In the drawings, these are shown as two groups as usually found in such valves, but it is to be understood that the invention comprises the use of the constrictor with only a single body part for a single group of openings, or a greater number of body parts, if a sleeve with a greater number of openings should be employed.

So illustrated, the two bodies are joined by a neck 14 and the lower body is provided with a spindle 15, which is threaded at 16 to fit the threads of the deck 10 at 16'. It is also provided with some means for rotating the constrictor so that it may be adjusted by the employment of the threads 16 within the sleeve. Such means is shown as a squared extremity 17 to which a wrench or other implement may be applied. Also for security, a lock nut 18 would probably be employed upon the threads 16.

As shown at Figures 1 and 3, the constrictor is positioned to allow the maximum volume of fluid to flow through the sleeve "B", as the bodies 13 and 13' are at their upper limit of movement. By loosening the lock nut 18 and rotating the constrictor by a wrench applied to the squared end 17, the constrictor, as an entirety, may be moved downwardly within the sleeve. At Figure 4, points indicated at 19 and 19' indicate that the portion of the body parts 13 and 13' above these points or lines are substantially cylindrical and measure the amplitude of adjustment which is provided by the device, that is to say, the device may be moved downwardly until the tops of the body parts 13 and 13' are substantially at the top of the passages "C". From the points indicated at lines 19 and 19', the lines as indicated at 20 and 20' (see Figure 4) are partly parabolic, as this has been found to provide a greater nicety of control than a taper, although the invention includes tapering. These lines 20 and 20' are shown as partly parabolic merely by way of showing a preferred embodiment; obviously other lines of curvature could be availed of.

When the constrictor has been adjusted to the proper position for attaining the aimed at results, it is locked in such position by again tightening the lock nut 18, and the valve will then function as a valve of smaller capacity than the original valve.

Of course, the valve constrictor herein described may be modified and changed in various ways without departing from the invention herein set forth and hereafter claimed.

I claim:—

1. The combination with a valve of the sleeve type having passages through its wall, of a constrictor located within the sleeve and having a part fitting the sleeve and a part reduced axially along parabolic lines adapted to be moved into position opposite to said passages, and means to move the fitting part to cover elected areas of the passages.

2. The combination with a valve of the sleeve type having a cylindrical interior and passages from the interior through the walls, of a constrictor located within the sleeve and having a part fitting its wall and continued by a reduced threaded part, and manually operable means including the threaded part to apply stress to actuate the constrictor to move the fitting part to cover elected areas of the passages.

3. The combination with a valve of the sleeve type having the sleeve formed as a cylinder with passages through the walls, said passages being tapered at one end, of a constrictor mounted within the sleeve and having a part fitting the cylindricity thereof and reduced to a threaded spindle, and manually operable means to adjust the constrictor by the employment of such threaded part to move the fitting part progressively over the tapered areas of the passages.

4. The combination with a valve of the sleeve type, said sleeve being constructed as a cylinder with passages through its walls pointed at one end, of a constrictor mounted within the sleeve, the constrictor having a part fitting the cylindricity of the sleeve and reduced to a spindle along partly parabolic lines, threads formed upon said spindle, threaded means cooperating with the threads of the spindle and manually operable means to rotate the constrictor to move the fitting part progressively over the pointed areas of the passages.

5. The combination with a valve of the sleeve type having a plurality of groups of passages through the wall, of a constrictor located within the sleeve and having a like number of cylindrical bodies fitting the sleeve, said bodies having tapered central extensions, and manually operable means to move the constrictor to move all of the fitting bodies simultaneously over elected areas of the passages of all groups.

6. The combination with a valve of the sleeve type, said sleeve being formed as a cylinder with a plurality of groups of passages through the wall, of a constrictor located within and having cylindrical parts fitting the sleeve, said parts corresponding in number to the groups of passages, said parts having tapered centrally located extensions, and manually operable means to move the constrictor by rotation to progressively move the fitting parts longitudinally and simultaneously over elected areas of the several groups of passages.

7. The combination with a valve of the sliding sleeve type, said sleeve being formed with a plurality of groups of passages through its walls, said passages of each group being pointed upon corresponding ends, of a constrictor located within the sleeve and having cylindrical parts fitting the cylindricity of the sleeve, said cylindrical parts having extensions tapered partly upon parabolic lines to reduced central parts, one of said central parts being threaded, manually operable means to move the constrictor longitudinally within the sleeve by employing said threads so that said fitting parts will progressively cover the pointed ends of the passages.

FRANCIS RUDOLPH GOEHRING.